(No Model.)
D. H. NASH.
BRIDLE BIT.
No. 568,097. Patented Sept. 22, 1896.
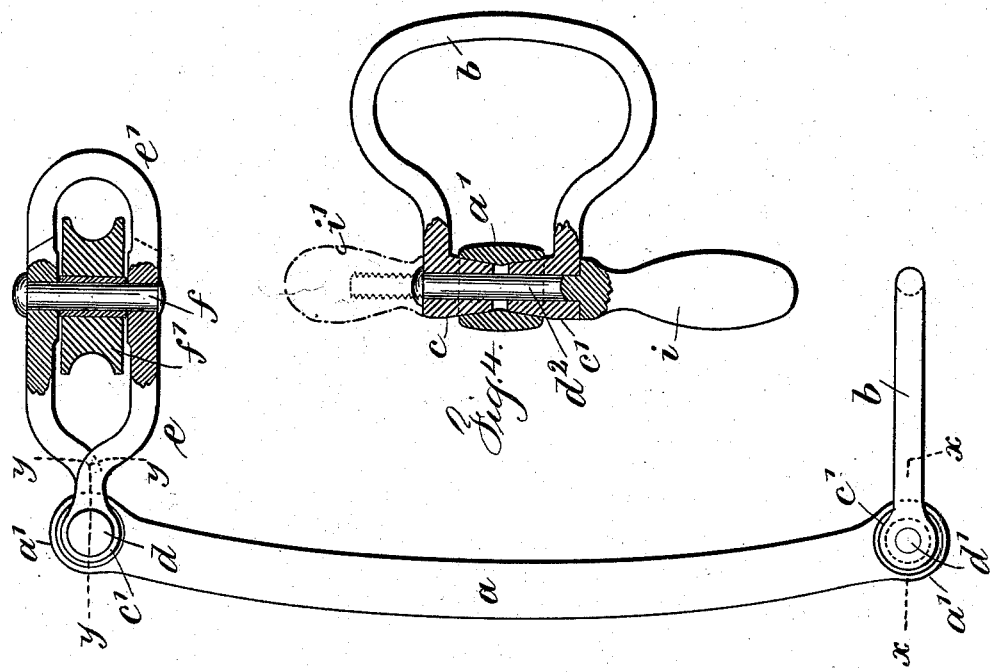
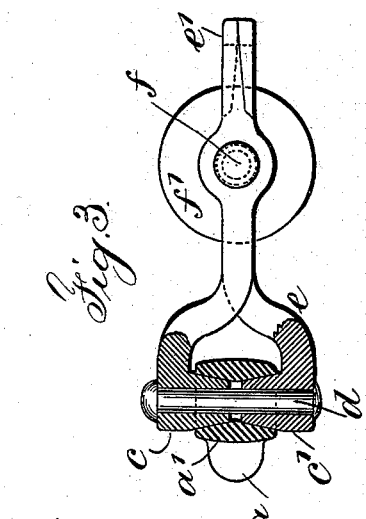
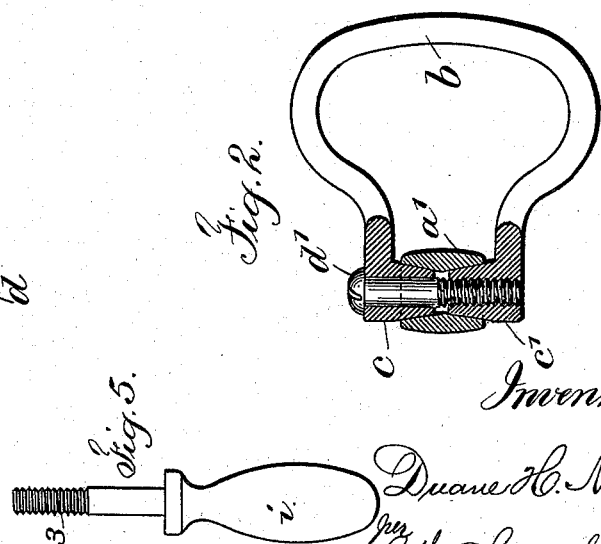
Witnesses
Chas. H. Smith
J. Staib
Inventor
Duane H. Nash
per L. W. Serrell & Son
Atty

UNITED STATES PATENT OFFICE.

DUANE H. NASH, OF MILLINGTON, NEW JERSEY.

BRIDLE-BIT.

SPECIFICATION forming part of Letters Patent No. 568,097, dated September 22, 1896.

Application filed June 23, 1896. Serial No. 596,576. (No model.)

*To all whom it may concern:*

Be it known that I, DUANE H. NASH, a citizen of the United States, residing at Millington, in the county of Morris and State of New Jersey, have invented a new and useful Improvement in Bridle-Bits, of which the following is a specification.

My invention relates to improvements in bridle-bits for horses, and the object of the present device is to be able to tighten the parts and so to overcome the looseness incident to wear, it being possible, with a little labor, to at all times keep the bridle-bits tight and in good condition for use.

In carrying out my invention I provide the bit-bar or mouthpiece with apertured ends that taper inward from opposite sides, and rein-rings having opposite conical ends adapted to be received into the apertured ends of the bit-bar, and I provide means for drawing said conical ends toward each other to tighten them in the bit. I prefer that these means shall consist of a pin or screw passing through openings in said conical ends, and in one form of my invention I make the rein-rings twisted and provide a roller or sheave on a pin passing across through the rein-ring, and prefer, in this form of ring, to divide or split the loop portions so that the one part laps upon the other and the ends interlock. In this latter form the twisted rein-ring is more easily constructed, and, when connected to the bit-bar or mouthpiece, the parts are held tightly together, and should the sheave or roller in this give way and come out of the rein-ring the rein which passes through the ring simply draws up against the loop ends and does not separate from the rein-ring.

In the drawings, Figure 1 is a plan and partial section representing my improvement. Fig. 2 is a vertical section and partial elevation at the line $x\ x$ of Fig. 1. Fig. 3 is an elevation and partial section at the line $y\ y$ of Fig. 1. Fig. 4 represents by a section and partial elevation one form of my improvement, and Fig. 5 represents an elevation of one form of cheek piece or branch.

The bit-bar or mouthpiece is shown at $a$ and is of usual shape, being provided with apertured ends $a'$, that taper from opposite sides. The rein-ring $b$ is provided with opposite conical ends $c\ c'$, which are adapted to be sprung over the bit-bar and received into the apertured ends thereof, and I provide a means for drawing said conical ends toward each other to tighten them in the bit. This means I prefer shall consist of a pin $d$ or screw $d'$. Where the pin $d$ is employed, a head is formed on one end of the pin, and the same passes through plain openings in the conical ends $c\ c'$, and the other end of the pin is riveted up, and in case the parts wear and become loose to any extent it is only necessary to lay the head of the pin on an anvil or similar device and rerivet the head to tighten the parts. Where the screw $d'$ is employed, one of the conical ends has a plain opening and the other a threaded opening, and if looseness occurs through wear it is only necessary to turn the screw to bring the conical ends nearer together and tighten the parts. In Fig. 3 and upon one side of Fig. 1 I have shown the twisted rein-ring $e$ with a pin $f$, which may be either a screw-pin or rivet, passing across through the ring, and thereon between the sides of the ring is mounted a sheave $f'$, around which the driving-rein passes. The loop portion $e'$ of said twisted rein-ring I prefer to make divided or split, the parts being tapering and lapping and the ends, as indicated in Fig. 1, interlocking. This construction permits the twisted rein-ring being made in two pieces and facilitates the bringing together of the two pieces with the conical ends in the apertured ends of the bit-bar or mouthpiece without bending the rein-rings or springing said conical ends over the bit-bar, and when this two-part twisted ring is connected at its conical ends with a pin or screw the split and interlocking loop end will not separate, and in use if the pin $f$ should become worn and break and the sheave $f'$ drop out of the rein-ring no harm should come to the occupants of a vehicle being drawn by an animal having such a bit and rein-ring, because the rein will simply draw against the loop $e'$ and stop and cannot become separated therefrom.

In the form of my invention shown in Fig. 4 a cheek-piece $i$ or branch is represented as formed integral with the pin $d^2$, the pin passing through the conical ends $c\ c'$ and being riveted at its upper end. Instead of employing a plain pin with the cheek-piece $i$ the upper end of the pin may be threaded to form a screw-stem 3, (see Fig. 5,) passing into a threaded opening in the conical end c similar to that shown in Fig. 2, and where an auxiliary and smaller cheek-piece i', as shown by dotted lines in Fig. 4, is employed the screw-stem passes above the conical end c, and the cheek-piece or branch i' screws upon the said projecting end of the threaded stem in the capacity of a lock-nut.

My invention is simple, and the act of drawing together the conical ends, either by the riveted pins or by the screws, can be performed by any one of ordinary intelligence, so that in a bit thus constructed there need be no looseness caused by the wear of the parts, which looseness is often accompanied with sharp edges in the parts of the bit and rein-ring, that are an annoyance to the horse.

I claim as my invention—

1. In a bridle-bit, the combination with the bit-bar or mouthpiece having apertured ends that taper inward from opposite sides, of the rein-rings having opposite conical ends received into the tapering apertured ends of the bit-bar, and means for drawing said conical ends toward each other to tighten them in the bit, substantially as set forth.

2. In a bridle-bit, the combination with the bit-bar or mouthpiece having apertured ends that taper inward from opposite sides, of the rein-rings having opposite conical ends with longitudinal holes and received into the tapering apertured ends of said bit-bar and a pin in said holes adapted to draw the conical ends toward each other and tighten them in the bit, substantially as set forth.

3. In a bridle-bit, the combination with the bit-bar or mouthpiece having apertured ends that taper inward from opposite sides, of the rein-rings having opposite conical ends received into the tapering apertured ends of said bit-bar and means for drawing such conical ends toward each other to tighten them in the bit, and a sheave between the side parts of each of the rein-rings, and a pivot for such sheave, substantially as set forth.

4. In a bridle-bit, the combination with the bit-bar or mouthpiece having apertured ends that taper inward from opposite sides, of the divided rein-rings having opposite conical ends, received into the tapering apertured ends of the bit-bar, the loop portions of the divided rein-rings being double and lapping one on the other and interlocking, and means for drawing the conical ends toward each other to tighten the same in the bit, and a sheave between the side parts of each of the rein-rings and a pivot for the same, substantially as set forth.

5. The combination with a bit-bar or mouthpiece having near its ends cross-holes that are tapering and largest at their outer ends, of rein-rings having conical ends received into such holes and screws or rivets for drawing the conical ends toward each other and tightening them in the bit, substantially as specified.

6. The combination with a bit-bar or mouthpiece having near its ends cross-holes that are tapering and largest at their outer ends, of rein-rings having conical ends received into such holes, a cheek or branch piece and screws or rivets for drawing the conical ends toward each other and tightening them in the bit, substantially as specified.

Signed by me this 20th day of June, A. D. 1896.

DUANE H. NASH.

Witnesses:
  GEO. T. PINCKNEY,
  E. E. POLELI.